United States Patent [19]
Clark et al.

[11] Patent Number: 5,586,608
[45] Date of Patent: Dec. 24, 1996

[54] METHOD OF MAKING AN ANTI-BIT BALLING WELL FLUID USING A POLYOL HAVING A CLOUD POINT, AND METHOD OF DRILLING

[75] Inventors: David E. Clark, Humble; William M. Dye, Houston, both of Tex.

[73] Assignee: Baker Hughes Incorporated, Houston, Tex.

[21] Appl. No.: 473,614

[22] Filed: Jun. 7, 1995

[51] Int. Cl.$^6$ .............................. C09K 7/02; E21B 47/06; E21B 21/08
[52] U.S. Cl. .................... 175/40; 166/250.01; 175/64; 175/65; 507/136; 507/137; 507/139; 507/261; 507/262; 507/904; 507/925
[58] Field of Search .............................. 166/250.01, 300; 175/40, 64, 65; 507/136, 137, 138, 139, 261, 262, 263, 265, 904, 925

[56] References Cited

U.S. PATENT DOCUMENTS

| | | | |
|---|---|---|---|
| 3,977,472 | 8/1976 | Graham et al. | 507/261 X |
| 4,194,565 | 3/1980 | Kalfoglou | 507/262 X |
| 4,609,476 | 9/1986 | Heilwell . | |
| 4,619,773 | 10/1986 | Heilweil et al. . | |
| 4,631,136 | 12/1986 | Jones, III | 507/904 X |
| 4,637,882 | 1/1987 | Peiffer et al. . | |
| 5,007,489 | 4/1991 | Enright et al. | 175/65 |
| 5,076,364 | 12/1991 | Hale et al. | 166/310 |
| 5,076,373 | 12/1991 | Hale et al. | 175/40 |
| 5,085,282 | 2/1992 | Hale et al. | 175/40 |
| 5,099,930 | 3/1992 | Enright et al. | 175/65 |
| 5,120,708 | 6/1992 | Melear et al. | 507/136 X |
| 5,436,227 | 7/1995 | Hale et al. | 507/136 |

FOREIGN PATENT DOCUMENTS

0668339A1  8/1995  European Pat. Off. .

*Primary Examiner*—George A. Suchfield
*Attorney, Agent, or Firm*—J. M. (Mark) Gilbreth

[57] ABSTRACT

A method of making a well fluid for use in a well which includes the steps of determining uphole and downhole operating temperatures in the well, and then contacting a well lubricant with a lubricating additive, wherein the lubricating additive has a cloud point temperature greater than the uphole operating temperature and less than the downhole operating temperature. A method of lubricating drilling equipment during opeation of a subterranean well, includes the steps of determining uphole and downhole operating temperatures in the well, and then contacting the drilling equipment with a treating fluid comprising a well lubricant and a lubricating additive, with the lubricating additive having a cloud point temperature greater than the uphole operating temperature and less than the downhole operating temperature.

20 Claims, 2 Drawing Sheets

5,586,608

METHOD OF MAKING AN ANTI-BIT BALLING WELL FLUID USING A POLYOL HAVING A CLOUD POINT, AND METHOD OF DRILLING

BACKGROUND OF THE INVENTION

1. Field of the Invention

The present invention relates to a well fluid additive, to a making a well fluid additive, to a well fluid, to a method of making a well fluid, to a method of treating well equipment, and to a method of drilling. In another aspect, the present invention relates to an oil-in-water emulsion drilling, completion or workover fluid additive, to a method of making an oil-in-water drilling, completion or workover fluid, to an oil-in-water drilling, completion or workover fluid, to a method of making such a fluid, and to a method of treating drilling, completion or workover equipment. In still yet another aspect, the present invention relates to oil-in-water well fluids and to treating methods utilizing a polyol having a cloud point such that uphole the polyol is soluble in the water phase, and downhole the polyol is soluble in the oil phase, effecting a cycle of emulsification and de-emulsification to provide larger lubricating oil droplets downhole.

2. Description of the Related Art

Hydrocarbons are found in subterranean formations and are produced through wells penetrating producing formations. Production of oil and gas is generally accomplished through the use of rotary drilling technology, which requires the drilling, completing and working over of wells.

The formation is composed of both inorganic and organic substances, such as clays and other minerals as well as fossils, peat etc. As the drill bit teeth penetrate the formation, drill chips are generated by the action of the bit. These drill chips are wetted by the drilling fluid which can produce sticky, plastic fragments. These fragments adhere to the bit surface and the force and weight of the bit extrudes the water from the plastic fragments forming a compacted mass of the formation onto the bit surface that interferes with the cutting action of the bit teeth as evidenced by a reduction in penetration rate. Balling also occurs on drill collars and stabilizers further interfering with drilling operations.

Bit balling resulting in the compaction and adherence of drill chips to the face of the cutters and the bit is a primary cause of reduction of penetration rate during drilling operations. Bit balling is believed to be the result of adhesive forces between shale and the bit surface which become significant when ductile shales deform and are forced into intimate contact with each other and the bit surface.

A liquid adheres to a solid surface if the attraction of the molecules to the solid surface is greater than their attraction to each other, i.e., the work of adhesion is greater than the work of cohesion. This criterion may be expressed thermodynamically as:

$$W_A = F_S + F_L - F_I$$

Where $W_A$ is the work of adhesion; $F_S$ is the surface free energy of the solid; $F_L$ is the surface free energy of the liquid; and $F_I$ is the surface free energy of the newly formed interface. In terms of this expression, the work of cohesion, $W_C$, is equal to $xF_L$.

In order for adhesion to occur between the solid surface and a liquid, the work of adhesion must be greater than that of cohesion:

$$W_A - W_C = F_S - F_L - F_I$$

Accordingly, adhesion of the liquid to a solid occurs when the surface free energy of the solid surface exceeds that of the liquid and interface:

$$F_S > F_L + F_I$$

Shales adhere to bits and drill collars if they are forced into intimate contact by the force and weight of the drill string. The mechanism of adhesion in this instance is probably hydrogen bonding extending from the molecular layers of water adsorbed on the shale surface to the layer of water adhering to the water-wet steel surface of the bit.

In the past, those skilled in the art have particularly relied upon use of oil-based or water-in-oil (invert emulsions) drilling fluids to eliminate or control bit balling, although several aqueous based fluids and additives have been contemplated by those skilled in the art. The environmental problems and costs associated with the use of oil-based or invert emulsion systems have discouraged and/or prohibited their use on many wells.

As for lubrication, it has been proposed to incorporate an emulsifier in water base drilling fluids where the lubricant utilized is insoluble in water.

U.S. Pat. No. 5,007,489, issued Apr. 16, 1991, and U.S. Pat. No. 5,099,930 issued Mar. 31, 1991, both to Enright et al, are both directed at overcoming the above described limitations of the prior art. Both of these patents disclose a method of lubricating well equipment and the prevention of balling of formation cuttings with the use of an additive comprising a non-water soluble polyglycol and an emulsifying surfactant.

While the additives of these Enright et al. patents are a remarkable improvement over the prior art, they, like the other prior art additives, are most effective at the time of their addition, with the effects of lubrication diminishing over time.

Without being limited by theory, applicants believe that with the prior art oil-in-water emulsion well fluids, the oil droplets in the emulsion are sheared into smaller and smaller droplets by the action of drill bit, as the drilling operation progresses over time. These smaller droplets are less effective in covering the drill bit and other metallic surfaces, resulting in direct contact of the water phase with the metallic surfaces causing bit balling and loss of lubrication.

Thus, there is still in need in the art for improved well fluid additives, methods of treating a well fluid, and method of treating a well.

These and other needs in the art will become apparent to those of skill in the art upon review of this patent specification, including its drawings and claims.

SUMMARY OF THE INVENTION

It is one object of the present invention to provide for improved well fluid additives, methods of treating a well fluid, and method of treating a well.

These an other objects of the present invention will become apparent to those of skill in the art upon review of this patent specification, including its drawings and claims.

According to one embodiment of the present invention there is provided a method of making a well fluid for use in a well. The method generally includes determining uphole and downhole operating temperatures of the well into which the well fluid will be utilized. Next, the method includes forming an emulsion of an oil phase, water phase and a cloud point additive, wherein the cloud point additive has a cloud point temperature greater than the uphole operating temperature and equal to or less than the downhole operating temperature.

According to another embodiment of the present invention there is provided a method of lubricating drilling equipment during operation of a subterranean well. The method first includes determining the uphole and downhole operating temperatures in the well. Next, the method includes contacting the drilling equipment with a treating fluid by circulating the drilling between the uphole and downhole regions of the well, with the treating fluid comprising an oil phase, a water phase, and a cloud point additive.

DETAILED DESCRIPTION OF THE INVENTION

The present invention utilizes a well fluid additive for use in a water-in-oil emulsion well fluid, with the additive comprising a cloud point additive that is selected to be water soluble at the uphole region of the borehole, and oil soluble at the downhole region of the borehole.

Certain compounds are able to undergo a dynamic, reversible phase change from water-solubility to water-insolubility. These certain compounds possess a temperature cloud point, $T_{CP}$, below which they are water soluble and above which they are oil soluble, and are referred to herein as a cloud point additive.

Thus, the method of the present invention requires knowledge of the operating temperatures in both the uphole and downhole regions of the borehole so that the proper cloud point additive may be selected. Once the operating temperatures in both the uphole and downhole regions of the borehole are determined, a cloud point additive is selected which will have a cloud point that is above the uphole operating temperature but equal to or below the downhole operating temperature.

Use of a cloud point additive having a cloud point above the uphole operating temperature but equal to or below the downhole operating temperature, means that at the uphole region of the borehole, the cloud point additive is soluble in the water phase of the oil-in-water emulsion drilling fluid, and at the downhole region of the borehole, the cloud point additive is soluble in the oil phase of the oil-in-water emulsion drilling fluid.

While not wishing to be limited by theory, applicants believe that the present invention operates to provide sufficiently large sized oil droplets at the downhole region of the borehole which provide proper coverage of the drill bit and other metallic surfaces.

Downhole, the stable oil-phase droplets will adhere to the drill bit or other metallic surface of the drilling equipment to provide a non-water wetting interface between such surface and the water-wet shale fragment in the well fluid to prevent balling.

Figure 1:
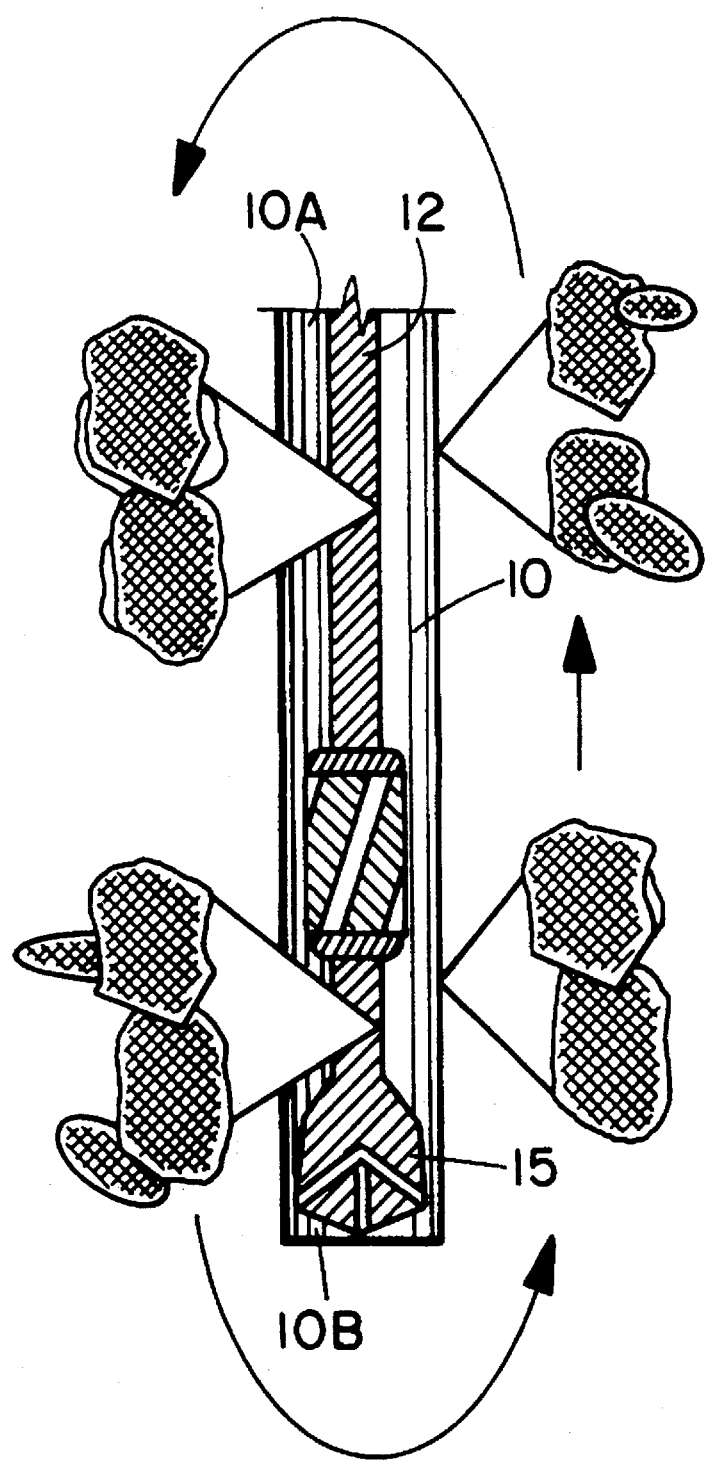
FIG. 1 is a schematic representation of the emulsion/de-emulsion cycle which applicants believe the present invention utilizes, showing borehole 10 with uphole region 10A and downhole region 10B, drilling string 12 and rotary drilling bit 15.

Referring now to FIG. 1 there is shown a schematic representation of applicants' nonlimiting theory showing borehole 10 with uphole region 10A and downhole region 10B, drilling string 12 and rotary drilling bit 15.

As the drilling fluid containing the oil-in-water emulsion system of the present invention is circulated within the subterranean well, it will come in contact with the surfaces of the drill bit. The emulsified droplets of oil-phase of the fluid will adhere and spread over the bit surface causing it to be wet with the non-water soluble component, thus resulting in an interruption of the water-to-water bonding which occurs between the water-wet bit surface and the water-wet shale which in turn eliminates the tendency for bit balling. Such contact will also impart lubricity to the surface of such equipment, reducing for example problems of differential sticking, torque and the like.

As with the prior art well fluids, the action downhole of the drill bit will shear these oil-phase droplets into smaller droplets. However, unlike the prior art well fluids, the droplets of the present invention will be reformed into large droplets.

As the well fluid is circulated uphole, the temperature of the well fluid decreases to below the cloud point temperature of the cloud point additive. The emulsion is broken as the cloud point additive leaves the oil phase for the water phase. Larger oil droplets are then formed to be returned downhole.

Thus, the oil-phase droplets are regenerated during each circulation cycle between the uphole and downhole regions of the well.

The cloud point additive utilized in the present invention is generally selected from among alcohols and derivatives thereof and must have a cloud point between the uphole region and downhole region operating temperatures. Such suitable alcohols include mono-, di-, tri- and poly-hydric alcohols which have a cloud point between the uphole region and downhole region operating temperatures. Non-limiting examples of classes of alcohols suitable for use in the present invention include glycols, sorbitols, and derivatives thereof. Additionally, while glycerols generally do not have cloud points, it is believed by the inventors that some glycerols might have the required cloud point and would thus be suitable. The preferred class of alcohols suitable for use in the present invention are glycols, most preferably a glycol having a molecular weight in the range of about 200 to about 2000, preferably in the range of about 500 to about 1000.

The cloud point additive of the present invention may be a di-hydroxy alcohols, such as polyalkylene glycols, particularly polypropylene glycol. The cloud point additive component may also be a propoxylated tri-hydroxy alcohol such as polyalkylene glycerols, particularly polypropylene glycerol. Ethylene oxide propylene oxide copolymers of di-hydroxy and tri-hydroxy alcohols may also be utilized as the cloud point additive utilized in the present invention. Ethoxylated alcohols are also useful in the present invention.

In the practice of the present invention, the cloud point fluid additive will generally comprise in the range of about 0.1 to about 99 volume percent of the oil-in-water emulsion well fluid. Preferably, the cloud point additive will comprise in the range of about 1 to about 50 volume percent of the oil-in-water emulsion well fluid. More preferably, the cloud point additive will comprise in the range of about 5 to about 35 volume percent, and most preferably in the range of about 5 to about 25 volume percent of the oil-in-water emulsion well fluid.

The well fluid of the present invention is an oil-in-water emulsion well fluid. The weight ratio of oil to water is generally in the range of about 1:99 to about 1:4, preferably in the range of about 1:20 to about 1:10. In such an oil-in-water system the base fluid is water. It is well known to those of skill in the art that the source for the base fluid water is generally not important. In fact, water for such a system may be fresh water, well water, sea water, brine, or combinations thereof.

The oil-phase of the oil-in-water well fluid of the present invention may include any non-water soluble material that will provide the required rate of penetration or lubrication. Common classes materials of materials utilized as rate of penetration or lubrication additives include naturally occuring fats and oils, esters, olefin isomers, poly alpha olefins, vegetable and mineral oils, diesel oils, parafin and napthenic oils.

Where environmental concerns exist, it is preferred in the practice of the present invention that naturally occuring fats, oils, hydrocarbons, and derivatives thereof be utilized as the oil phase component of the oil-in-water emulsion well fluid. Preferably, the naturally occuring fats, oils, hydrocarbons, and derivatives thereof be utilized as the oil phase component of the oil-in-water emulsion well fluid are selected to be non-toxic and/or biodegradable.

As naturally occuring oils and fats having double and triple carbons bonds exhibit a tendency to oxidize in use or upon heating which leads to polymerization or other negative effects, a suitable amount of an antioxidant may be utilized. The antioxidant must be compatible with the well fluid, and is generally selected from among p-phenylenediamines, secondary arlyamines, alkylarylamines, ketone amines, dihydroquinolines, alkylated phenols, phosphite esters, and alkylated phenol sulfides.

Naturally occurring fats and oils suitable for use as the oil phase component of the oil-in-water well fluid of the present invention includes the following animal oils and fats: butter, lard, tallow, grease, herring, menhaden, pilchard and sardine; and including the following vegetable oils and fats: castor, coconut, corn, cottonseed, jojoba, linseed, liticica, olive, palm, palm kernel, peanut, rapeseed, safflower, soya, sunflower, tall and tung. Preferred naturally occurring oils and fats include rapeseed, castor, cotton seed, palm kernel, sunflower and lard. Most preferred naturally occurring oils and fats include rapeseed, castor and lard. The preferred rapeseed oil utilized in the present invention is a high erucic acid rapeseed oil.

Suitable fatty acids and derivatives thereof for use in the practice of the present invention include those having a carbon chain length of 8 or more. The carbon length is generally selected to provide proper compatibility with the other components of the well fluid. The carbon length is also generally selected to provide a desired reduction in the balling of formation cuttings upon the surface of the drilling equipment and/or to impart lubricity to the drilling equipment.

Generally, the fatty acids and derivatives thereof utilized in the present invention have a carbon chain length in the range of about 8 to about 30 carbon atoms. Preferably, the fatty acids and derivatives thereof utilized in the present invention have a carbon chain length in the range of about 14 to about 22 carbon atoms, and most preferably in the range of about 18 to about 22 carbon atoms.

Specific nonlimiting examples of fatty acids suitable for use in the present invention include octanoic, decanoic, dodecanoic, 9-dodecenoic(cis), tetradecanoic, 9-octadecenoic-12-hydroxy(cis), 9,12,15-octadecatrienoic(cis,cis,cis), 9,11,13-octadecatrienoic(cis,trans,trans), 9,11,13-octadecatrienoic-4-oxo(cis,trans,trans), octadecatetrenoic, eicosanoic, 11-eicosenoic(cis), eicosadeinoic, eicosatrienoic, 5,8,11,14-eicosatetraenoic, eicosapentaenoic, docosanoic, 13-docosenoic(cis)docosatetraenoic, 4,8,12,15, 19 docosapentaenoic, docosahexaenoic, tetracosenoic, 4,8, 12,15,18,21-tetracosahexaenoic.

Derivatives of the above described fatty acids may also be utilized in the present invention. Such derivatives include alkali, alkaline earth, or transition metal substituted fatty acids; oxidized fatty acids; amides of fatty acids; salts of fatty acids; esters of fatty acids; sulfated fatty acids; sulfonated fatty acids; alkoxylated fatty acids; phosphatized fatty acids; and mixtures thereof. Preferably, the fatty acid derivatives utilized in the present invention are oxidized fatty acids, esters of fatty acids, sulfated fatty acids and sulphonated fatty acids. Most preferably, the fatty acid derivatives utilized in the present invention are oxidized fatty acids and esters of fatty acids.

Derivatives of erucic acid suitable for use in the present invention include high erucic acid rapeseed oil ("HEAR"); oxidized HEAR oil; sulfated HEAR oil; sulfonated HEAR oil; alkali metal erucates, especially sodium erucate; alkaline earth erucates, especially calcium erucate; transition metal erucates, especially iron erucate; glycerol and polyglycerol esters of erucic acid (mono, di- and tri-); sorbitol and sorbitan esters of erucic acid (mono, di-, tri- and poly-); erucic acid esters and diesters from polyethylene glycols, polypropylene glycols and other polyalkylene oxides and/or esters; erucic acid esters of water-insoluble (or poorly water soluble) alcohols, especially 2-ethylhexyl alcohol; alkoxylated erucic acid, especially ethoxylated or propoxylated erucic acid; sulfurized HEAR oil; phosphatized HEAR oil; erucamide from alkanolamines such as diethanol amine; polyglycol amine and diamine erucamides; and mixtures thereof. Preferably, the erucic acid derivatives utilized in the present invention are oxidized erucic acids, esters of erucic acids, sulfated erucic acids and sulphonated erucic acids. Most preferably, the fatty acid derivatives utilized in the present invention are oxidized erucic acids and esters of erucic acids.

It is understood that in the practice of the present invention, the oil-in-water system may also include any of the additives and components known to those of skill in the art, such as antioxidants, bentonite, barite, gums, water soluble polymers, viscosity modifying agents, breakers, emulsifiers, thinners, circulation control additives and the like.

EXAMPLES

Example 1—Penetration Data

Rate of penetration data was obtained according to the procedures outlined in SPE No. 28708, herein incorporated by reference.

Basically, testing was performed on Catoosa shale with a rollercone bit (IADC 517) and a PDC bit (IADC M332) to determine the effects of mud additives on drilling rate.

While the concentration of swelling clay is low in the Catoosa shale, so low that it is not highly reactive, it still causes bit-bailing comparable to Pierre shale. The samples were added to the base mud at levels ranging from 2 to 4 volume percent, as recommended by the supplier. The treated mud was circulated through the bit several times and allowed to reach a temperature of about 160° F. before initiation of drilling.

Figure 2:
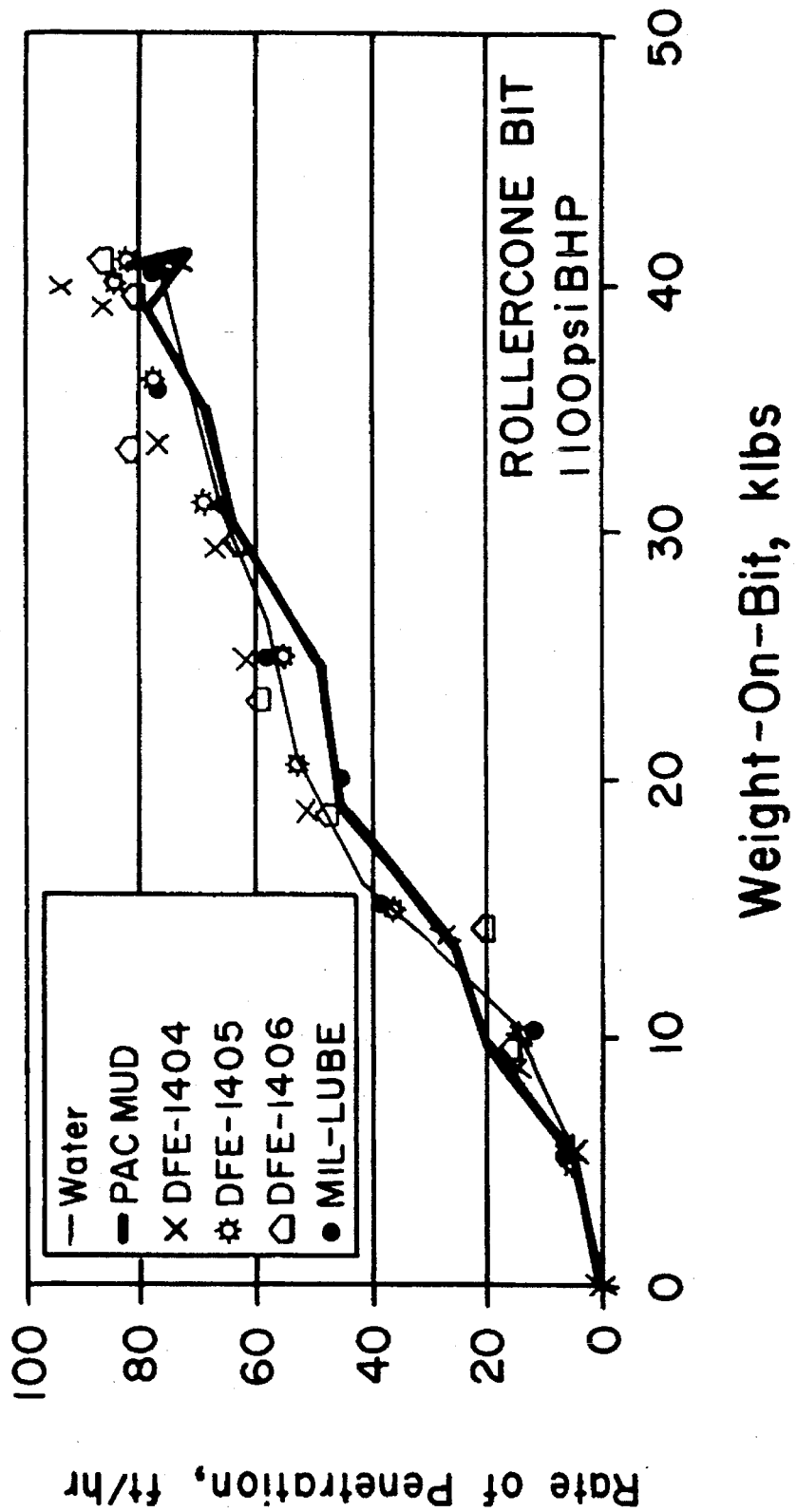
FIG. 2 is a table showing Rate of Penetration vs. Weight-on-bit for various additives tested the Example.

For each test, the flow rate of the mud was contained at 350 gpm, and the nozzles were configured to give a bit HSI (hydraulic horsepower per square inch) of 2.5 for cleaning. To simulate downhole conditions, borehole pressures of 1000 and 2000 psi were selected. The borehole pressure is created by restricting the exiting flow from the pressure vessel containing the shale sample. The drilling performance of each mud additive was evaluated by incrementing the weight-on-bit (WOB) while maintaining a constant rotary speed of 120 rpm. The results are presented in the following FIG. 2, in which "PAC MUD" additive and "MIL-LUBE" additive are commercially available additives, "FE-1404" olefin isomer comprises an olefin isomer, and "DFE-1405" glycol and "DFE-1406" glycol are both comprise cloud point glycols of the present invention.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

We claim:

1. A method of making a well fluid for use in a well, comprising the steps of:
   (a) determining uphole and downhole operating temperatures in the well; and
   (b) forming an emulsion of an oil phase, water phase and a cloud point additive, wherein the cloud point additive has a cloud point temperature greater than the uphole operating temperature and equal to or less than the downhole operating temperature.

2. The method of claim 1 wherein the cloud point additive is selected from among mono-, di-, tri- and poly-hydric alcohols.

3. The method of claim 1 wherein the cloud point additive is a glycol.

4. The method of claim 3 wherein the glycol comprises a molecular weight in the range of about 200 to about 2000.

5. The method of claim 1 wherein the emulsion comprises in the range of about 1 to about 50 volume percent cloud point additive.

6. The method of claim 1 wherein the oil phase comprises naturally occuring fats, oils, hydrocarbons, and derivatives thereof.

7. The method of claim 1 wherein the cloud point additive is selected from among mono-, di-, tri- and poly-hydric alcohols, the oil phase comprises naturally occuring fats, oils, hydrocarbons, and derivatives thereof, and the emulsion comprises in the range of about 1 to about 50 volume percent cloud point additive.

8. The method of claim 7 wherein the cloud point additive comprises glycol.

9. The method of claim 7 wherein the naturally occurring fats and oils include at least one selected from among animal oils and fats consisting of butter, lard, tallow, grease, herring, menhaden, pilchard and sardine, and from among vegetable oils and fats consisting of castor, coconut, corn, cottonseed, jojoba, linseed, liticica, olive, palm, palm kernel, peanut, rapeseed, safflower, soya, sunflower, tall and tung.

10. The method of claim 7 wherein the oil phase comprises high erucic acid rapeseed oil.

11. A method of lubricating drilling equipment during the drilling, completion or workover of a subterranean well, comprising the steps of:
    (a) determining uphole region and downhole region operating temperatures in the well; and
    (b) contacting the drilling equipment with a treating fluid by circulating the treating fluid between the uphole region and downhole region, with the treating fluid comprising an oil phase, a water phase, and a cloud point additive, wherein the cloud point additive has a cloud point temperature greater than the uphole operating temperature and equal to or less than the downhole operating temperature.

12. The method of claim 11 wherein the cloud point additive is selected from among mono-, di-, tri- and poly-hydric alcohols.

13. The method of claim 12 wherein the cloud point additive is a glycol.

14. The method of claim 13 wherein the glycol comprises a molecular weight in the range of about 200 to about 2000.

15. The method of claim 11 wherein the emulsion comprises in the range of about 1 to about 50 volume percent cloud point additive.

16. The method of claim 11 wherein the oil phase comprises naturally occuring fats, oils, hydrocarbons, and derivatives thereof.

17. The method of claim 11 wherein the cloud point additive is selected from among mono-, di-, tri- and poly-hydric alcohols, the oil phase comprises naturally occuring fats, oils, hydrocarbons, and derivatives thereof, and the emulsion comprises in the range of about 1 to about 50 volume percent cloud point additive.

18. The method of claim 17 wherein the cloud point additive comprises glycol.

19. The method of claim 17 wherein the naturally occurring fats and oils include at least one selected from among animal oils and fats consisting of butter, lard, tallow, grease, herring, menhaden, pilchard and sardine, and from among vegetable oils and fats consisting of castor, coconut, corn, cottonseed, jojoba, linseed, liticica, olive, palm, palm kernel, peanut, rapeseed, safflower, soya, sunflower, tall and tung.

20. The method of claim 17 wherein the oil phase comprises high erucic acid rapeseed oil.

* * * * *